United States Patent [19]

Puro

[11] 4,126,215
[45] Nov. 21, 1978

[54] SEALED ELECTROMAGNETIC TORQUE TRANSLATING DEVICE

[75] Inventor: John F. Puro, Elmira, N.Y.

[73] Assignee: Facet Enterprises, Inc., Tulsa, Okla.

[21] Appl. No.: 752,504

[22] Filed: Dec. 20, 1976

[51] Int. Cl.² .............................................. F16D 27/10
[52] U.S. Cl. .................................................. 192/84 C
[58] Field of Search .......................... 192/84 R, 84 C; 188/218 A, 163; 310/103, 104, 105

[56] References Cited

U.S. PATENT DOCUMENTS

| | | | |
|---|---|---|---|
| 2,263,079 | 11/1941 | Flynn | 188/218 A |
| 3,190,420 | 6/1965 | Kampf | 192/84 C |
| 3,381,784 | 5/1968 | Miller et al. | 192/84 C X |
| 3,381,785 | 5/1968 | Mendenhall | 192/84 C X |
| 3,743,068 | 7/1973 | Westervelt | 192/84 C |
| 3,848,878 | 11/1974 | Mayer | 188/218 A |

Primary Examiner—Allan D. Herrmann
Attorney, Agent, or Firm—Remy J. VanOphem

[57] ABSTRACT

The invention is an electromagnetic clutch with a novel sealing means to prevent dirt and lint particles from entering the working surfaces of the clutch, resulting in substantial increase in the life of the clutch as well as eliminating the need for lubrication during the useful life of the clutch.

9 Claims, 2 Drawing Figures

SEALED ELECTROMAGNETIC TORQUE TRANSLATING DEVICE

BACKGROUND OF THE INVENTION

The invention relates to an electromagnetic torque transmitting device suitable for use as a brake or clutch, and more specifically, to an electromagnetic brake or clutch wherein a seal is utilized to isolate the working surfaces, or air gap, as well as the bearing surfaces of the device and thereby avoid foreign matter from entering said working or bearing surfaces.

Various types of electromagnetically operated brakes and clutches now in use have an operating air gap between an electromagnetic field body, which is isolated with an electrically energized coil to have magnetic flux induced therein when the coil is energized, and a magnetically retractable armature mounted for movement towards or away from the magnetic body in response to energization of the coil.

In commercial use, such as the making of string or thread on open side spinning frames in textile mills, chain driven clutches are used to receive the thread from the spinning head. Since the thread is made from cotton fiber or lint particles, the atmosphere surrounding the clutch is heavily laden with these lint particles or fibers.

Prior art clutches operating in this atmosphere have proven themselves to require a great deal of maintenance, specifically, lubrication. The lack of lubrication results in down time of the open frame spinning machine because of the total break down of the clutch. In prior art clutches the lint or foreign fibers gradually work their way into the working surfaces of the clutch and clog up the working surfaces of the air gap and interfere with the proper operation of the clutch. Further, cotton lint or foreign fibers also build up near the bearing surfaces of the output member as well as the input body and because of the nature of the foreign substance the oil is drawn out of the lubricant impregnated bearings. This results in excessive lubrication. If lubrication is lacking, the clutch bearings freeze up and demand replacement of the clutch. Obviously, this results in very high maintenance cost and excessive down time to replace the clutches in the spinning frames.

SUMMARY OF THE INVENTION

The present invention is directed to a electromagnetic torque translating device usable as a brake or clutch, having a novel sealing means which effectively prevents lint or other extraneous fiber particles from working their way into the operating surfaces of the clutch, as well as from collecting near the bearing surfaces of the clutch.

The present invention relates to a single surface electromagnetic clutch or braking device for translating torque from an input means to an output means which utilizes a plurality of seals to effectively eliminate foreign fiber particles or lint from entering the working area between the output and input means and thereby effect the operating characteristics of the device. Further, sealing means are utilized to prevent foreign fibers or lint from building up in the bearing area of the clutch thereby eliminating a high source of maintenance cost and increasing the effective life of the clutch. The prior art problems of inadequate lubrication as well as decaying operating characteristics are thereby eliminated.

It is, therefore, a primary object of this invention to provide a single surface electromagnetic clutch or brake which is sealed to prevent foreign matter from entering its working surfaces.

It is a further object of this invention to provide an electromagnetic clutch or brake which has a torque output not adversely effected by the means used for sealing the electromagnetic device.

It is still a further object of this invention to provide an electromagnetic clutch or brake having a seal which does not substantially retard the movement of the torque transmitting members in either direction, but yet effectively seals the working surfaces against the entry of extraneous particles, such as lint or fiber.

A further object of this invention is to provide an electromagnetic torque translating device in which the bearing surfaces are not subject to being deprived of their lubricant due to the entry of foreign matter or lint into the bearing surface area.

Another object of this invention is to provide a seal for an electromagnetic clutch to which the foreign substance of the surrounding atmosphere of the clutch is not attracted.

Another object of this invention is to provide an electromagnetic clutch or brake having a plastic seal which does not attract lint or foreign substances in the surrounding working area of the clutch and which can be utilized as a bearing material for either the driven or driving member of the clutch.

Other objects and avantages of this invention become more apparent from the following detailed description taken in conjunction with the accompanying drawings.

DETAILED DESCRIPTION OF THE PREFERRED EMBODIMENT

Figure 1:
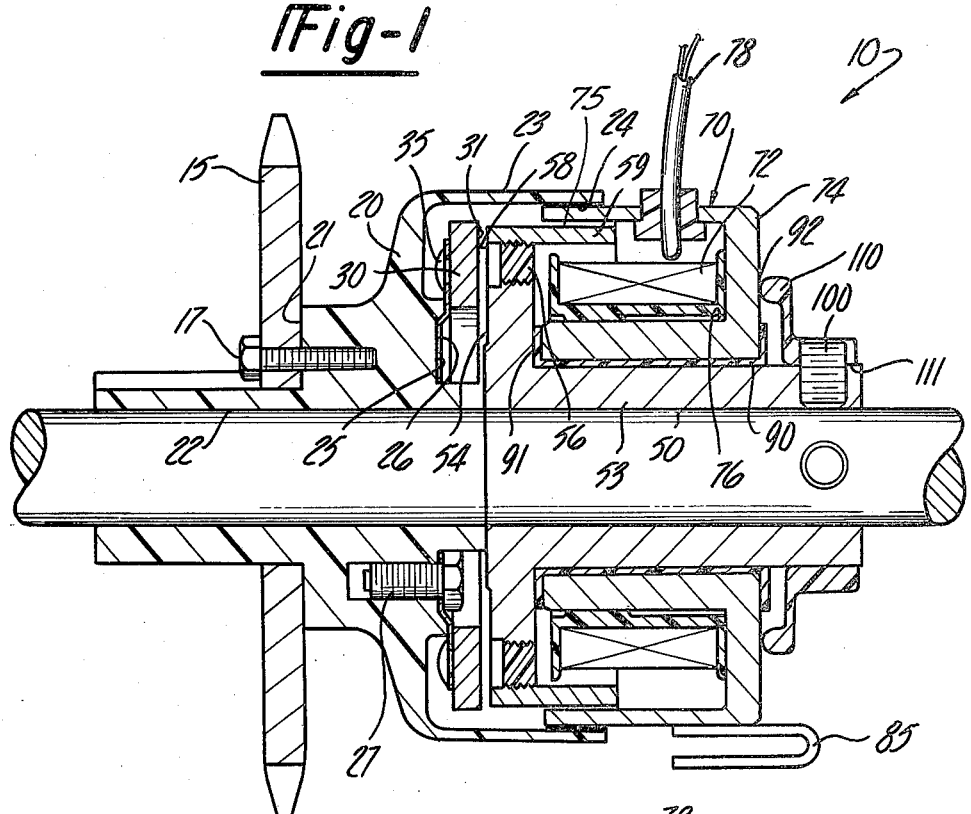
FIG. 1 is a cross sectional view of a magnetic clutch in a de-energized state, showing the present invention.

Referring to FIG. 1, there is shown an electromagnetic torque translating device merely illustrative of the general type of clutch or brake which may embody the present invention. In the particular embodiment shown in FIG. 1, the clutch is electromagnetically engaged and spring released. However, it is to be understood that the present invention may be provided on clutches which are spring applied and electromagnetically released, as well as on brakes which are either electromagnetically applied and spring released or vice versa.

The electromagnetic clutch 10 shown in FIG. 1 comprises, in general, an annular input or driving member 20, an annular output or driven member 50, an electromagnetic actuating means 70, and appropriate sealing and bearing means, later to be described.

The torque translating device is mounted to a shaft (not shown) and driven by way of a chain drive (not shown) which overrides a sprocket member 15 to provide a mode of power input to the driving or input member 20. The sprocket 15 is attached to the input member 20 by any suitable means such as screws 17. One end of the input member 20 provides a shoulder portion 21 to receive the sprocket mounted thereon. The input member, further, has a bearing surface 22 on its inner diameter which mounts to a shaft. A cup-shaped axial extension 23 on the input member's outer diameter is sufficiently long to contact the electromagnetic means and provide a seal surface 24 between the electromagnetic means 70 and the input driving member axial extension. The cup-shaped portion 23 of the input member further has an internal shoulder portion 25 to which is mounted a resilient member 26, such as a spring, by the use of any convenient means, such as screws 27. An annular armature member 30 is also mounted to the resilient member 26 by a suitable mounting means, such as a rivet 35. The armature is retained within the cup-shaped axial extension 23 of the input driving member and further has a working face 31 perpendicular to the clutch center axis.

In the preferred embodiment, the input driving member is of a plastic material. Being of plastic material allows the inner diameter 22 to provide a bearing between the sprocket and the shaft. The plastic material being chemically lubricated, therefore, eliminates the need of lubrication to this bearing. Further, the foreign fibers or lint in the atmosphere surrounding the clutch are not attracted to said plastic material. As stated above, the cup-shaped axial extension of the input driving member surrounds the electromagnetic means and provides a seal 24 between the electromagnetic means and the input driving member. Since the input driving member is of plastic material, the seal 24 generates virtually no drag between the rotating input driving member and the stationary fixed electromagnetic means, while at the same time, preventing the foreign fibers and lint present in the atmosphere surrounding the clutch from entering the working area of the clutch.

The preferred embodiment shown in FIG. 1 utilizes an integral construction of the annular inner body member 50 which is mounted to the output shaft (not shown). The inner body member 50 is comprised of three concentric annular elements 53, 56, and 59, which form an integral rotatable body. In order to establish two separate flux conducting surfaces 54, 58, the radially inner body member 53 of the output or driven means is separated from the radially outer body member 59 of the output or driven means by a non-conductive ring 56. This specific feature of electromagnetic clutches, that is, establishing two poles, is a well known principle in the art. The non-conductive ring member 56 may be manufactured from various non-magnetic materials, such as stainless steel, brass, etc. The inner body magnetic pole face 54 is normal to the output shaft axis and parallel to the armature face 31. The outer body member 59 of the output means also has a magnetic pole face 54 disposed normal to the clutch axis and parallel to the annular armature face 31.

The electromagnetic actuating means 70 comprises an electromagnetic winding or coil 72 and flux conducting housing 74 for the electromagnetic winding. The electromagnetic winding or coil is disposed within a cavity of the housing 76 and is contained therein by any suitable adhesive, such as epoxy. The coil may be manufactured from copper wire or any other suitable material and is suitably connected to a d.c. power source and an electrical control means 78 (not shown) for energization. The housing is axially and rotatably fixed by an appropriate mounting bracket 85, which maintains the electromagnetic housing stationary with respect to the input member upon energization of the clutch.

A friction free bearing 90 is maintained between the fixed housing 74 of the electromagnetic means 70 and the inner body member 50 to provide for rotatable movement of the inner body member with respect to the housing and, further, a sliding electromagnetically conductive contact, which is well known in the art, is provided 75 between the annular radially outer body member of the inner body and the electromagnetic housing. The bearing member 90 has a shoulder 91 at one end which abuts the inner body member. The annular inner body member 50 is mounted to the shaft by any convenient means, such as set screws 100.

To provide a seal and prevent foreign fiber or lint material from getting into the working area of the bearing member 90, a sliding seal 110 is mounted 111 to the inner body member and is in contactive engagement with both the electromagnetic housing and the inner body member. This sliding seal being made of a plastic material of the type that does not attract lint or foreign fiber material, provides a function of sealing the bearing area from the atmosphere surrounding the clutch. This plastic disc seal prevents lint or other foreign substances from entering the bearing area and depriving the plastic bearing of its lubrication characteristics.

Figure 2:
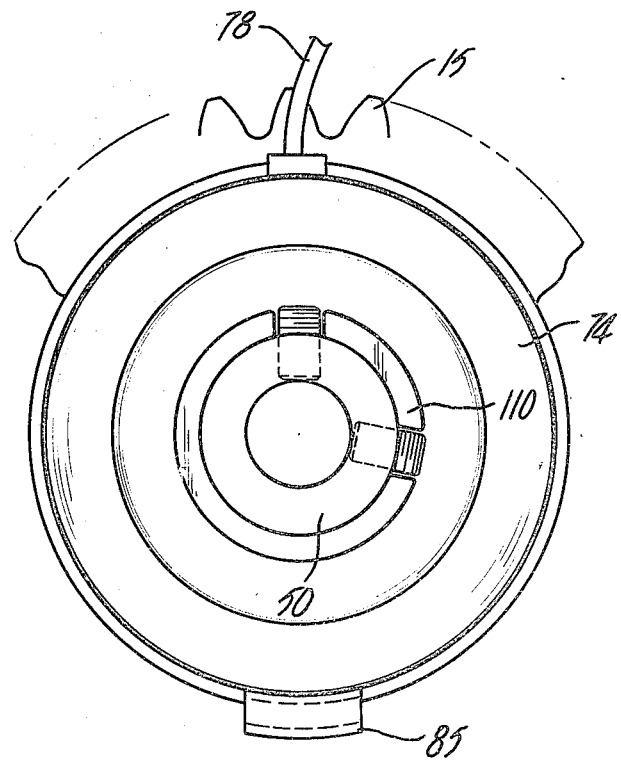
FIG. 2 is an end view taken in the direction of arrows 2—2.

FIG. 2 shows an end view of the clutch. The disc seal member 110 is mounted to the inner body member and slides against the electromagnetic housing 74. The sprocket member 15 is mounted coaxial with the central shaft (not shown). The mounting bracket 85 is attached to a convenient mounting surface and maintains the power source connection 78 in a fixed position.

It is readily apparent to one skilled in the art that the method of sealing the clutch working surfaces and bearing areas is readily adaptable to a brake or other electromagnetic torque translating device. Therefore, it is intended that the description given herein is not to limit the scope of the invention.

OPERATION

In operation, the torque translating device is mounted to a common shaft with the electromagnetic housing being mounted to a fixed surface. A chain drive (not shown) is attached to the sprocket member for rotating the driving or input member relative to the shaft. The shaft, inner body member, and electromagnetic coil housing are stationary with respect to the sprocket member and driving or input member when the electromagnetic coil is de-energized. The cup-shaped outer diameter extension of the input member is in sliding engagement with the electromagnetic housing. When the electromagnetic coil is energized, the armature is moved axially into engagement with the pole faces of the inner body member. The spring member attached to the armature as well as the input member provides for the armature to return to its initial rest position after the electromagnetic means is de-energized.

Upon engaging the armature, the inner body begins to rotate and drive the output shaft. The electromagnetic housing remains fixed with respect to the inner body member upon energization of the electromagnetic means and the sliding seal mounted to the inner body member rotates with the inner body and provides a sliding engagement with the electromagnetic housing. It can thus be seen that in operation the working areas of the electromagnetic engaging surfaces, as well as the bearing surfaces for the input member and the electromagnetic housing are totally sealed from any foreign substances, such as lint, or cotton fiber, which is present in the surrounding environment of the clutch.

While the preferred embodiment of the invention has been disclosed, it will be apparent to those skilled in the art, that changes may be made to the invention as set forth in the claims and, in some instances, certain features of the invention may be used to advantage without corresponding use of other features. Accordingly, it is intended that the illustrative and descriptive materials herein be used to illustrate the principles of the invention and not to limit the scope thereof. While the form of the embodiment of the invention as herein disclosed constitutes a preferred form, it is to be understood that other forms might be adopted as may come within the scope of the claims which follows.

What is claimed is:

1. A torque translating device comprising:
   a shaft;
   a driven clutch member mounted to said shaft for rotation therewith;
   a driving clutch member mounted adjacent said driven clutch member for communication therewith;
   an armature member mounted to one of said clutch members;
   electromagnetic actuating means mounted to the other of said clutch members for providing a torque translating driving engagement between said clutch members when said electromagnetic actuating means is energized;
   means for mounting said armature to one of said clutch members, said mounting means comprising a resilient member interposed said armature member and said one of said clutch members, said resilient member being attached to said armature and said one of said clutch members such that when said electromagnetic actuating means is energized, said resilient member deflects from a first position to permit said armature to engage said other clutch member and when said electromagnetic actuating means is de-energized, said resilient member returns said armature to said first position;
   means for mounting said electromagnetic actuating means to the other of said clutch members, said mounting means having a first bearing member mounted coaxially with said other of said clutch members, said bearing member allowing said electromagnetic actuating means to remain fixed with respect to the clutch members upon energization of said electromagnetic actuating means;
   said one of said clutch members further having an annular axially extended outer diameter cup shaped portion in sliding engagement with said electromagnetic actuating means such that said armature member and electromagnetic means are sealed to avoid foreign matter from entering the area of engagement between said armature and said other clutch member; and
   means for sealing said first bearing member interposed said electromagnetic actuating means and the other of said clutch members, said sealing means mounted to the other of said member, said means for sealing being rotatable and in sealing engagement with said electromagnetic actuating means such that said first bearing member is sealed to prevent foreign matter from entering the bearing surfaces between said electromagnetic actuating means and the other of said clutch members.

2. The torque translating device as claimed in claim 1 further comprising:
   a sprocket member mounted to one of said members to provide a power input to said driving member;
   means for attaching said resilient member to said armature and to one of said clutch members;
   bearing means interposed said one of said clutch members and said shaft, said bearing means having a seal surface between one of said clutch members and said shaft; and
   means for mounting said sprocket member to one of said members.

3. The torque translating device as claimed in claim 1, wherein, said one of said clutch members is fabricated from a plastic material.

4. The torque translating device as claimed in claim 2, wherein, said one of said clutch members is fabricated from a plastic material.

5. The torque translating device as claimed in claim 3, wherein, said plastic material further is chemically treated to provide a bearing between said shaft and said driving member inside diameter.

6. The torque translating device as claimed in claim 4, wherein, said plastic material further is chemically treated to provide a bearing between said shaft and said driving member inside diameter.

7. In combination with a torque translating device of the type having a shaft with an annular first clutch member mounted adjacent an annular second clutch member thereon; an armature attached to one of said members and an electromagnetic clutch actuating means mounted coaxially with said first and second clutch members for communicating therewith, the improvement comprising:
   first means for sealing said torque translation device mounted adjacent said electromagnetic clutch actuating means, said sealing means being integral with said first clutch member and further comprising:
   an annular axially extending outer diameter cup-shaped portion mounted to said first clutch member, said axially extending portion being in sliding engagement with said electromagnetic clutch actuating means;
   means for bearing interposed said first clutch member and said shaft, said bearing means having a seal surface between said first clutch member and said shaft, said seal surface and annular axially extending outer diameter cup shaped portion of said first clutch member cooperating with said shaft and electromagnetic actuating means respectively such that said armature member and the electromagnetic actuating means are sealed to avoid foreign matter from entering the area of engagement between said armature and said electromagnetic actuating means;
   second means for sealing said torque translating device mounted adjacent said electromagnetic clutch actuating means and said shaft, said second sealing means comprising:
   an annular seal member mounted coaxial with said shaft and adjacent said electromagnetic means, said seal member having a first portion in sliding engagement with said electromagnetic clutch actuating means;
   an annular bearing member interposed said electromagnetic actuating means and said shaft, said bearing member permitting said electromagnetic means to remain fixed with respect to said shaft when said electromagnetic means is energized; and
   means for mounting said seal member to said shaft for rotation therewith such that when said electromagnetic means is energized, said seal member communicates with said electromagnetic means and shaft to provide a seal therebetween and thereby avoid foreign matter from entering the area of engagement between said bearing member, said electromagnetic housing and said shaft.

8. The combination as claimed in claim 7, wherein, said first clutch member is fabricated from a plastic material.

9. The combination as claimed in claim 8, wherein, said plastic material is chemically lubricated to provide a bearing surface.

* * * * *

UNITED STATES PATENT AND TRADEMARK OFFICE
CERTIFICATE OF CORRECTION

PATENT NO. : 4,126,215
DATED : November 21, 1978
INVENTOR(S) : John Frederick Puro It is certified that error appears in the above-identified patent and that said Letters Patent is hereby corrected as shown below:

Column 5, line 56, delete "member," and insert ---- clutch members, ----.

Signed and Sealed this

Thirtieth Day of December, 1986

Attest:

DONALD J. QUIGG

*Attesting Officer*  *Commissioner of Patents and Trademarks*